United States Patent Office 2,934,314
Patented Apr. 26, 1960

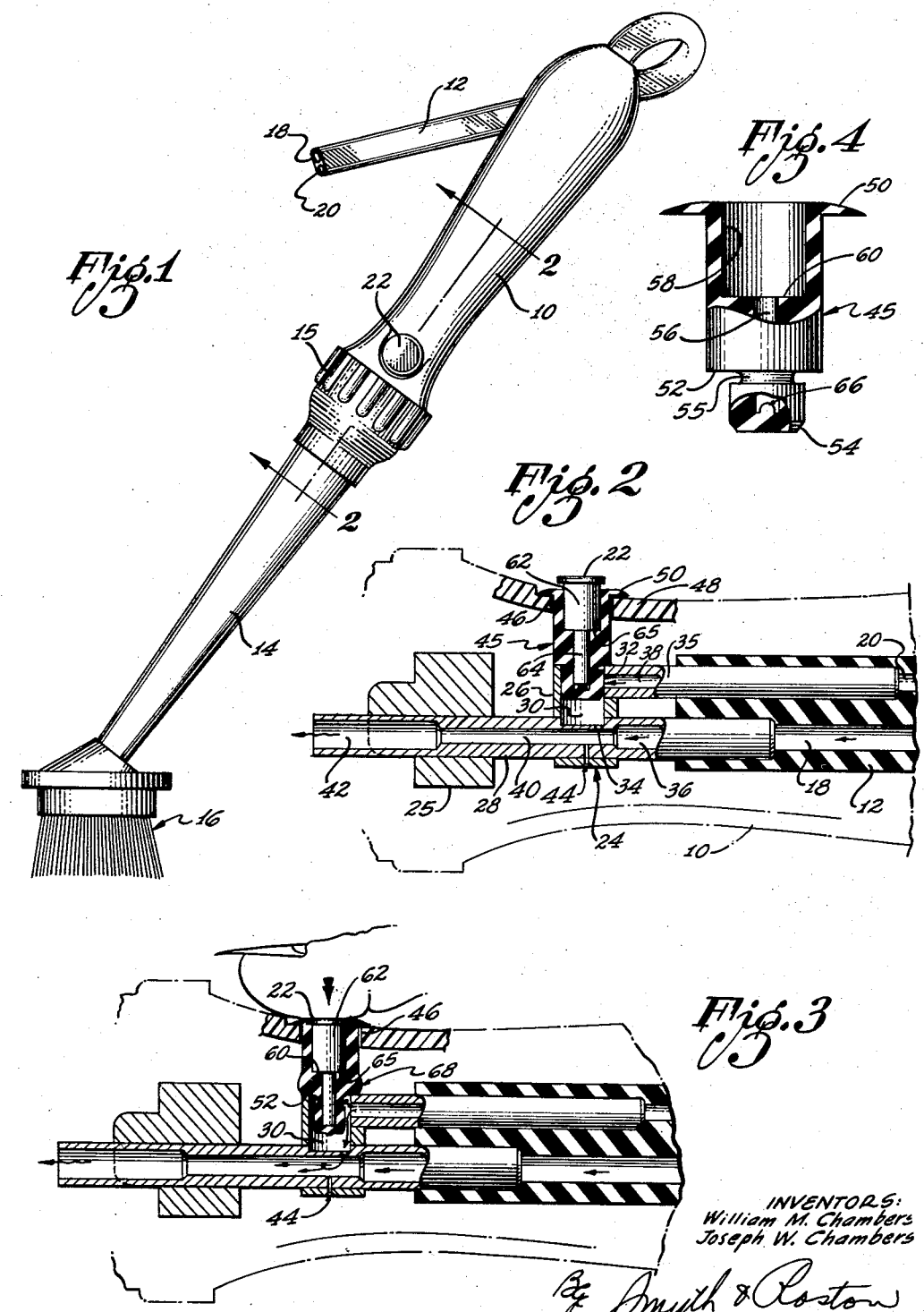

2,934,314
VALVE

William M. Chambers, Los Angeles, and Joseph W. Chambers, Inglewood, Calif., assignors to Electro-Way Corporation, Los Angeles, Calif., a corporation of California Application January 18, 1957, Serial No. 634,892

3 Claims. (Cl. 251—331)

This invention relates to a valve structure and is especially applicable for controlling relatively low rates of flow of fluid at relatively low pressures. While the invention is widely useful for various purposes it has special utility as a thumb-actuated valve for controlling the introduction of detergent into a stream of water in a fountain brush assembly for manually washing dishes. The description herein of this particular embodiment of the invention will provide adequate guidance for those skilled in the art who may have occasion to apply the same principles to other specific purposes.

A valve structure for such a brush assembly must meet certain requirements. In the first place, it must function as a normally closed valve to seal off the detergent when clear water is required to rinse the dishes. This requirement is important because detergents are not fit for human consumption and should be completely removed from dishes and silverware.

In the second place, the valve should be operable by relatively light finger or thumb pressure for ease and convenience in the use of the fountain brush assembly by a housewife. In the third place, since the fountain brush is held in the hand for a dishwashing operation, the valve should be of light weight to keep down the weight of the fountain brush assembly and should be compace in construction to mimize the size of the fountain brush assembly.

A fourth requirement is that a valve of this character for this particular use should be of simple durable construction to provide a relatively long trouble-free service life. Finally, the valve should be of a construction that permits it to be quickly repaired or renewed when necessary in a simple manner without requiring special tools or any special skill.

The invention meets all of these requirements by a valve assembly in which a resilient rubber-like plug fits into a valve chamber and normally spans the interior of the valve chamber in radial compression against the inner wall of the chamber. The valve chamber has two ports, at least one of which is positioned in the inner wall in a position to be sealed by the rubber-like plug. Suitable actuating means is provided to elongate the rubber-like plug with consequent retraction of the plug from the side wall of the valve chamber to permit flow between the two valve ports.

In the presently preferred practice of the invention the valve chamber in the handle of the brush assembly is positioned radially of the handle and the rubber-like plug extends radially from the valve chamber to the surface of the handle, the inner end of the plug extending into the chamber for the required normal sealing action. A plunger having its outer end exposed for thumb actuation extends into the plug longitudinally thereof and terminates inside the inner end portion of the plug. Depression of the plunger by thumb pressure elongates the inner end portion of the plug to permit fluid flow through the valve chamber.

Since the rubber plug extends into one end of the valve chamber, provision must be made to prevent leakage past the plug when the plug is elongated for fluid flow through the valve chamber. The preferred practice of the invention meets this requirement by forming the rubber-like plug with an inwardly facing peripheral shoulder in abutment against an outwardly facing circumferential shoulder of the valve chamber. Thus, when the plunger is depressed to permit fluid flow through the valve chamber, the circumferential plug shoulder is pressed against the complementary valve chamber shoulder to seal off the chamber against leakage.

The various advantages and features of the invention may be understood from the following detailed description, taken with the accompanying drawing.

In the drawing, which is to be regarded as merely illustrative:

Figure 1 is a side elevation of a typical fountain brush assembly incorporating the presently preferred embodiment of the invention;

Figure 2 is a greatly enlarged longitudinal section taken as indicated by the line 2—2 of Figure 1 and showing the valve in its normal closed position;

Figure 3 is a view similar to Figure 2 showing the valve held in its open position by thumb pressure; and Figure 4 is an enlarged view of the valve member, the view being partly in section and partly in side elevation.

Figure 1 shows what may be termed a fountain brush assembly of a well known type of device for washing dishes by hand, which brush assembly incorporates the presently preferred embodiment of the invention. The brush assembly includes a handle 10 with a dual passage hose 12 connected to one of its ends and with a forwardly extending tapered nozzle 14 mounted on its other end in a removable manner by a threaded bushing 15. A fountain brush 16 is removably mounted on the outer end of the nozzle 14 and the liquid supplied by the nozzle 14 is divided into numerous small streams distributed throughout the brush in a well known manner. The dual passage hose 12 has a relatively large passage 18 through which water is supplied from the sink plumbing and has a smaller passage 20 which receives liquid detergent from a suitable reservoir. The water from the dual passage hose 12 is conveyed through the handle 10 and the nozzle 14 to the brush assembly and a button 22 is depressed by the operator for actuation of the valve of the present invention whenever it is desired to mix detergent with the water flowing to the fountain brush.

The dual passage hose 12 is terminally connected inside the handle 10 to what may be termed an inductor fitting that is generally designated by numeral 24. This inductor fitting includes a cylindrical body 25 by means of which it is fixedly mounted inside the handle structure and includes a valve body 26, these two bodies being mounted on a rigid tube 28. The valve body 26 forms a cylindrical valve chamber 30 having an inlet port 32 in its peripheral wall and an outlet port 34 in its inner end wall. A second tube 35 is rigidly united with the valve body 26 in communication with the inlet port 32. The dual passage hose 12 telescopes over the two tubes 28 and 35 with the water passage 18 of the dual hose communicating with the passage 36 formed by the tube 28 and with the detergent passage 20 of the dual passage hose communicating with the corresponding passage 38 formed by the tube 35.

The tube 28 is restricted to form a throat passage 40 in the region of the valve body 26 wherein the velocity of the water is accelerated with consequent pressure drop and wherein the mixing of the detergent with the water is carried out. The throat passage opens into a relatively large nozzle passage 42 that is directed into the nozzle 14. A small vent port 44 places the throat passage 40 in communication with the atmosphere, this vent port being positioned slightly down stream from the outlet port 34 of the valve body 26.

A valve member 45 of suitable resilient rubber-like material seats in a bore 46 in the shell or wall 48 of the handle 10 and extends into the hollow interior of the handle and into the open end of the radially oriented valve chamber 30. Preferably the valve member 45 is a molded body formed with a circumferential lip 50 at its outer end to engage the outer surface of the handle and thus prevent bodily displacement of the valve member into the interior of the handle. The valve member 45 is of reduced diameter at its inner end to fit into the valve chamber 30 and to form an inwardly facing peripheral shoulder 52 that abuts the outer end of the valve chamber, the outer end of the valve chamber forming a corresponding outwardly facing peripheral shoulder. Preferably, the valve member 45 is chamfered at its outer end as indicated at 54 in Figure 4 and has a circumferential groove 55 at the base of the shoulder 52, the groove forming a reduced neck. The valve member 45 is formed with a blind bore 56 that terminates in its inner reduced end and is further formed with a counterbore 58 that opens on its outer end and provides an outwardly facing annular inner circumferential shoulder 60. The blind bore 56 together with the counterbore 58 formed what may be termed an axially extending cavity that opens on the outer end of the valve member, this cavity forming the inner circumferential shoulder 60.

In this embodiment of the invention, the means for actuating the valve member 45 is a plunger 62, the previously mentioned button 22 being integral with the outer end of the plunger. The plunger 62 is formed with an extension 64 of reduced diameter and is thus provided with an inwardly facing annular shoulder 65. The plunger 62 fits into the counterbore 58 of the valve member with its annular shoulder 65 abutting the annular shoulder 60 of the valve member and with the shank extension 64 of the plunger extending through the blind bore 56 into the reduced inner end of the valve member. Preferably the shank extension 64 abuts a small boss 66 formed in the material of the valve member at the end of the blind bore.

The unrestrained diameter of the inner end portion of the valve member is slightly larger than the inside diameter of the valve chamber 30 so that the inner end of the valve member normally fits into the valve chamber under sufficient radial compression to seal the inlet port 32 effectively against the entrance of detergent from the passage 38. With the valve normally closed in this manner water is free to flow from the dual hose passage 18 through the passage 36, the throat 40 and the nozzle passage 42 of the inductor fitting. The reduction in pressure in the throat 40 created by the increased velocity of the flow of the water therethrough causes air to be drawn into the throat through the vent port 44 with consequent desirable aeration of the stream of water. The prevailing low pressure in the throat passage 40 tends to produce a partial vacuum in the valve chamber 30 by reason of communication therewith through the valve outlet port 34 but the effective manner in which the valve member 45 normally seals the inlet port 32 holds back the detergent in the passage 38.

When the operator depresses the button 22 by thumb pressure in the manner indicated in Figure 3, the shank extension 64 of the plunger elongates the inner end of the valve member with consequent reduction in diameter of the inner end of the valve member and contraction away from the peripheral wall of the valve chamber 30 to establish communication between the inlet port 32 and the outlet port 34. With the stream of water creating subatmospheric pressure in the throat 40, the resulting pressure differential acting on the detergent causes the detergent to flow from the passage 38 through the inlet port 32 into the valve chamber 30 and out of the valve chamber through the outlet port 34 into the throat 40 for intermixture with the water in the throat. Thus, detergent is mixed to the water that is supplied to the fountain brush 16 as long as the operator depresses the button 22.

In the preferred practice of the invention the valve member 45 is made of neoprene having a Shore hardness of 70–80, the hardness being important and this degree of hardness being found satisfactory where the valve chamber 30 has a diameter on the order of one quarter inch. The exact inside diameter of the valve chamber 30 may be 0.248 inch with a slight tolerance and the unrestrained diameter of the inner end portion of the valve member 45 may be .004 to .006 inch larger than the inside diameter of the valve chamber. It has been found that both the chamfer 54 and the groove 55 forming the reduced neck in the valve member are important for satisfactory operation. Apparently both the chamfer and the groove increase the tendency of the inner end portion of the valve member to contract radially in response to actuation of the plunger 62. It has been found that the groove 55 is also advantageous since in some instances the elongated and radially contracted inner end portion of the valve member may lie against the inlet port 32 and thus tend to keep the inlet port closed. The groove 55 prevents any such sealing action, however, since the groove is displaced into the region of the inlet port 32 by the elongation of the valve member and thus provides space for fluid flow away from the inlet port.

For reasons that are not clearly understood, the presence of the vent port 44 is important and the location of the vent port is somewhat critical. For optimum operation the vent port 44 in the described construction should be offset down stream from the outlet port 34 by $\frac{1}{16}$ to $\frac{1}{8}$ inch, the offset being preferably approximately $\frac{3}{32}$ inch. The provision of the vent port 44 increases the rate of water flow from 20 to 30 percent and apparently prevents vapor lock that would otherwise occasionally prevent the flow of detergent when the button 22 is depressed.

It will be noted in Figure 3 that the depression of the plunger 62 places an intermediate portion of the valve member 45 under axial compression as indicated by the bulge 68. This axial compression results from the movement of the annular shoulder 65 of the plunger against the annular shoulder 60 of the valve member and the opposing abutment of the peripheral shoulder 52 of the valve member against the end of the valve body 26. Thus, when the thumb pressure is removed, the plunger 62 is quickly restored to its normal position both by energy stored in the elongation of the inner end portion of the valve member and energy stored in the axial compression of the intermediate portion of the valve member.

In this regard, it is to be noted that the circumferential lip 50 at the outer end of the valve member 45 is engaged by the surrounding fixed structure or wall 48 of the handle. With the outer end of the valve member 45 anchored in this manner, depression of the operating member or plunger 62 against the inner circumferential shoulder 60 of the valve member places the outer end portion of the valve member in longitudinal tension, i.e., the circumferential wall of the valve member between the lip 50 and the inner annular shoulder 60. This longitudinal stressing of the outer end portion of the valve member also stores energy for returning the plunger 62 to its normal position when the plunger is released from finger pressure.

It is apparent that the simplicity of the described valve makes it inexpensive to manufacture. Since only the rubber-like material of the valve member is stressed the valve will provide a long service life without any attention or maintenance. It is apparent that the valve may be renewed quickly and conveniently, whenever desired, simply by withdrawing the valve member 68 and inserting a new valve member. This simple operation requires no special tools and no special skill.

Our description in specific detail of the selected embodiment of the invention will suggest various changes, substitutions and other departures from our disclosure within the spirit and scope of the appended claims.

We claim:

1. In a valve, the combination of: a valve body forming a cylindrical chamber open at one end, said cylindrical chamber having an inlet port and an outlet port, one of said two ports being a peripheral port in the cylindrical wall of the chamber, said chamber being formed with a circumferential shoulder facing outwardly of the open end of the chamber; a resiliently yieldable rubber-like valve member closing the open end of said chamber and extending into the chamber with a cylindrical inner end portion of the valve member extending across said peripheral port, said inner portion having an unstressed configuration larger in cross section than the interior of the chamber for normally sealing said port to prevent flow of said fluid through the chamber, said valve member having an outer circumferential shoulder seating against said circumferential shoulder of the valve body to hold the valve member against inward bodily shift, said valve member having an axially extending cavity that extends into the region of said inner portion of the valve member and opens onto the outer end of the valve member, said cavity forming an inner circumferential shoulder that faces towards the outer open end of the cavity, said inner circumferential shoulder being spaced axially outward from said outer circumferential shoulder of the valve body to define therewith a compression portion of the valve member; and a rigid operating member exposed at its outer end and extending into said cavity for manual depression inward from a normal retracted position to elongate said inner end portion of the valve member and thereby radially contract said inner end portion of the valve member to open said peripheral port, said operating member having a shoulder seating against said inner circumferential shoulder of the valve member to force said inner circumferential shoulder axially towards said outer circumferential shoulder of the valve body for resilient longitudinal compression of said compression portion of the valve member when the operating member is depressed whereby said compression portion serves as a compression spring for normally holding said operating member in its retracted position and for exerting sealing pressure against said circumferential shoulder of the valve body when the operating member is depressed as well as for restoring the operating member to its retracted position when it is released from its depressed position, said valve member having an outer circumferential groove normally spaced axially outwardly from said peripheral port to increase the radial contraction of said inner end portion of the valve member in response to elongation of the inner end portion by depression of said operating member, the inner end of said inner portion of the valve member being chamfered for further contraction of said inner end portion of the valve member in response to elongation of the inner end portion by depression of said operating member.

2. In a valve, the combination of: a valve body forming a cylindrical chamber open at one end, said cylindrical chamber having an inlet port and an outlet port, one of said two ports being a peripheral port in the cylindrical wall of the chamber, said chamber being formed with a circumferential shoulder facing outwardly of the open end of the chamber; a resiliently yieldable rubber-like valve member closing the open end of said chamber and extending into the chamber with a cylindrical inner end portion of the valve member extending across said peripheral port, said inner portion having an unstressed configuration larger in cross section than the interior of the chamber for normally sealing said port to prevent flow of said fluid through the chamber, said valve member having an outer circumferential shoulder seating against said circumferential shoulder of the valve body to hold the valve member against inward bodily shift, said valve member having an axially extending cavity that extends into the region of said inner portion of the valve member and opens onto the outer end of the valve member, said cavity forming an inner circumferential shoulder that faces towards the outer open end of the cavity, said inner circumferential shoulder being spaced axially outward from said outer circumferential shoulder of the valve body to define therewith a compression portion of the valve member; and a rigid operating member exposed at its outer end and extending into said cavity for manual depression inward from a normal retracted position to elongate said inner end portion of the valve member and thereby radially contract said inner end portion of the valve member to open said peripheral port, said operating member having a shoulder seating against said inner circumferential shoulder of the valve member to force said inner circumferential shoulder axially towards said outer circumferential shoulder of the valve body for resilient longitudinal compression of said compression portion of the valve member when the operating member is depressed whereby said compression portion serves as a compression spring for normally holding said operating member in its retracted position and for exerting sealing pressure against said circumferential shoulder of the valve body when the operating member is depressed as well as for restoring the operating member to its retracted position when it is released from its depressed position, said valve member having an outer circumferential groove normally spaced axially outwardly from said peripheral port to increase the radial contraction of said inner end portion of the valve member in response to elongation of the inner end portion by depression of said operating member, the inner end of said inner end portion of the valve member being chamfered for further contraction of said inner end portion of the valve member in response to elongation of the inner end portion by depression of said operating member, said groove being normally displaced axially from said peripheral port but positioned to be shifted into communication with the peripheral port when said inner portion is elongated by depression of said operating member.

3. In a valve to control the flow of a fluid under sub-atmospheric pressure, the combination of: a valve body forming a cylindrical chamber open at an one end, said cylindrical chamber having an inlet port and an outlet port, one of said two ports being a peripheral port in the cylindrical wall of the chamber, said chamber being formed with a circumferential shoulder facing outwardly of the open end of the chamber; a resiliently yieldable rubber-like valve member closing the open end of said chamber and extending into the chamber with a cylindrical inner end portion of the valve member extending across said peripheral port, said inner portion having an unstressed configuration larger in cross section than the interior of the chamber for normally sealing said port to prevent flow of said fluid through the chamber, said valve member having an outer circumferential shoulder seating against said circumferential shoulder of the valve body to hold the valve member against inward bodily shift in response to the differential between atmospheric pressure and said sub-atmospheric pressure, said valve member having an axially extending cavity that extends into the region of said inner portion of the valve member and opens onto the outer end of the valve member, said cavity forming an inner circumferential shoulder that faces towards the outer open end of the cavity, said inner circumferential shoulder being spaced axially outward from said outer circumferential shoulder of the valve body to define therewith a compression portion of the valve member; a rigid operating member exposed at its outer end and extending into said cavity for manual depression inward from a normal retracted position to elongate said inner end portion of the valve member and thereby radially contract said inner end portion of the valve member to open said peripheral port, said operating member having a shoulder seating against said inner circumferential shoulder of the valve member to force said inner circumferential shoulder axially towards said outer circumferential shoulder of the valve body for resilient longitudinal compression of said compression portion of the valve member when the operating member is depressed whereby said compression portion serves as a compression spring for normally holding said operating member in its retracted position and for exerting sealing pressure against said circumferential shoulder of the valve body when the operating member is depressed as well as for restoring the operating member to its retracted position when it is released from its depressed position, said valve member having an outer end tension portion adjacent said compression portion; and fixed support means engaging the outer end of said tension portion whereby said tension portion is stressed in tension by depression of said operating member to cooperate with said compression portion for resisting depression of the operating member.

References Cited in the file of this patent

UNITED STATES PATENTS

| | | |
|---|---|---|
| 2,540,064 | Weber | Jan. 30, 1951 |
| 2,625,176 | Williams | Jan. 13, 1953 |
| 2,788,244 | Gilmour | Apr. 9, 1957 |

FOREIGN PATENTS

| | | |
|---|---|---|
| 2,049 | Great Britain | Aug. 25, 1860 |